3,341,316
METHOD FOR DESTRUCTION AND PREVENTION OF WEEDS

Justin H. Reinhart, Jamesburg, N.J., assignor to Olin Mathieson Chemical Corporation, a corporation of Virginia
No Drawing. Filed Nov. 6, 1964, Ser. No. 409,568
1 Claim. (Cl. 71—88)

This invention relates to herbicidal compositions and methods employing 6,8-dinitro-1,3-benzodioxane as the essential herbicidal ingredient.

This compound is known, having been prepared and disclosed by Chattaway and Irving in J. Chem. Soc., 1931, 2492. It has the formula:

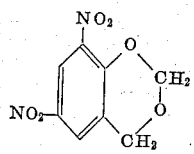

It has now been found that 6,8-dinitro-1,3-benzodioxane is an extremely effective herbicide, and valuable herbicidal formulations containing this derivative are provided in accordance with this invention. The chemical is active as a post-emergence herbicide, but it is especially valuable as a pre-emergence herbicide since it is unusually selective when applied in this manner. The method of this invention thus comprises applying a herbicidal amount of 6,8-dinitro-1,3-benzodioxane to the locus to be protected from undesirable weed growth; for example, it is applied directly to weeds in post-emergence treatment and to soil areas in pre-emergence treatment.

For instance, when the chemical is used in pre-emergence treatment and applied to a soil area, it has been found that the growth of valuable crops such as cotton and corn in that area is not inhibited. However, the growth of a wide variety of undesirable weeds in the treated area surrounding the crops is nearly completely prevented. Although the substituted benzodioxane is active against various broad-leaved weeds such as mustard and pigweed in pre-emergence treatment, it is even more potent in preventing the growth of the so-called grassy weeds such as rye grass, crab grass and the like.

Although the 6,8-dinitro-1,3-benzodioxane may be directly administered to the area where control of weed growth is desired, it is preferably admixed with carriers and diluents which are commonly referred to as pest control adjuvants. Thus a wide variety of such adjuvants may be utilized with the herbicide of this invention to provide herbicidal formulations conveniently adapted for application using conventional applicator equipment. In this respect, both solid and liquid herbicidal formulations containing 6,8-dinitro-1,3-benzodioxane as the essential active ingredient are provided in accordance with this invention.

For example, dust compositions are readily provided by mixing the active ingredient with various free-flowing solid carriers and grinding the resulting mixture to obtain a dust having an average particle size of about 20–50 microns. Concentration by weight of the active ingredient in these dusts is generally in the range of about 5–20% although larger concentrations may be utilized if desired. Among the solid carriers which may be employed in such formulations are natural clays such as attapulgite and kaolinite clays, diatomaceous earth, finely divided talcs and synthetic mineral fillers derived from silica and silicate such as synthetic fine silica and synthetic calcium and magnesium silicates. Other suitable carriers include magnesium and calcium carbonates.

The 6,8-dinitro-1,3-benzodioxane may be advantageously formulated with other carriers to provide wettable powders. These powders are conveniently prepared by mixing the active ingredient with solid carriers of the aforementioned type and adding to the mixture a surface-active agent in amount sufficient to impart water dispersibility to the powdered compositions. Aqueous dispersions of such wettable powders are particularly adapted for spraying and sprinkling operations on areas which are to be protected from weed growth.

Numerous surface-active agents are available and suitable for use in such wettable powders. These agents may be referred to as wetting or dispersing agents, and they may be of the nonionic, cationic or anionic type. Mixtures of such agents are conveniently employed in these formulations in a manner well known to those skilled in this art. For example, among those surface-active agents commonly employed in these compositions are alkyl aryl sulfonates such as sodium decyl benzene sulfonate, fatty alcohol sulfates such as sodium dodecyl sulfate, alkali metal oleates, sodium lignosulfonate and the like. A comprehensive listing of many other surface-active agents suitable for use in the formulation of typical agricultural dispersions, suspensions, etc., has been prepared and disclosed by McCutcheon in "Soap and Chemical Specialties," 31, Nos. 7–10 (1955).

Wettable powders of the above type will usually contain about 0.1–10.0% by weight of the aforementioned surface-active agents with the preferred concentration naturally being dependent upon the nature of the system in which the agent is used and the particular type of application technique being employed. Wettable powders containing about 2–5% of these surface-active agents are generally prepared.

Other solid herbicidal compositions containing the 6,8-dinitro-1,3-benzodioxane active ingredient are provided in accordance with this invention by dissolving the chemical in a volatile solvent (i.e., acetone) and impregnating this solution upon granular solids such as attapulgite clay, ground vegetable shells, walnut shells, and the like. Upon removal of the solvent, potent solid herbicidal formulations are obtained.

Similarly, suspension-type formulations may be conveniently prepared having the substituted benzodioxane as the active ingredient. For instance, an acetone solution of 6,8-dinitro-1,3-benzodioxane containing one of the above listed dispersing agents can be added to water to provide suspensions which are especially suitable for spraying operations.

Naturally in order to control the undesirable weed growth, the active ingredient must be applied to the area or locus to be protected in an amount sufficient to exert the desired herbicidal action. Thus it may be necessary to apply different amounts of 6,8-dinitro-1,3-benzodioxane to achieve a desired result depending upon the extent and nature of weed growth, application procedures and other varying features. It has been found that effective herbicidal action can be obtained by supplying the substituted benzodioxane at a rate of about 2–20 pounds per acre with an amount of 10 pounds per acre being adequate for most applications. The formulations utilized may contain anywhere from 0.5% to about 90% by weight of the active ingredient, again depending upon the particular results desired, the methods of application, etc.

The following examples illustrate in detail how 6,8-dinitro-1,3-benzodioxane can be effectively employed as a selective herbicide in accordance with this invention. They also illustrate the preparation of other effective herbicidal formulations having the substituted benzodioxane as active ingredient. As will be apparent to those skilled in the art, other methods of application and other effective formulations may be conveniently utilized.

EXAMPLE 1

A test plot was prepared in a shallow metal flat measuring 14 x 28 x 3½ inches. Crop species were planted in rows in the flat and covered with ¼ inch of soil. Seeds of a variety of weeds were planted in discrete segments of the flat and similarly covered with soil. The test plot was then passed by means of a moving belt under a spray which applied a solution composed of 0.25 pound of 6,8-dinitro-1,3-benzodioxane per gallon of acetone uniformly to the plot. This rate of application was equivalent to 10 pounds of the active ingredient per acre. After six weeks in a greenhouse, the plot was examined and the proportion of growth for each species of crop and weed was recorded. The result of the test is set forth in Table I below. In that table 0 indicates that the chemical had no effect on growth and 100 indicates that the chemical completely killed the particular species of crop or weed specified. Thus, a value of 80 indicates that 80% of the area of the plot planted with a particular species of crop or weed contained no growing plant.

Table I

| Plant species: | Rating—growth control |
| --- | --- |
| Cotton | 0 |
| Corn | 10 |
| Rye grass | 90 |
| Crab grass | 80 |
| Love grass | 100 |
| Panicum | 100 |
| Quack grass | 100 |

EXAMPLE 2

An acetone spray containing only 0.125 pound of 6,8-dinitro-1,3-benzodioxane per gallon was applied to crop and weed species using the identical procedure in Example 1. This rate of application was equivalent to five pounds of active ingredient per acre. Nearly identical results were obtained as in Example 1; that is, the valuable crops were essentially uneffected by the treatment while growth of the undesirable grassy weeds was nearly completed inhibited.

EXAMPLE 3

Dust compositions containing 6,8-dinitro-1,3-benzodioxane which are effective herbicidal formulations are also provided in accordance with this invention. For example, a suitable dust formulation is prepared by mixing 6 parts by weight of the active ingredient with 94 parts by weight of attapulgite clay and grinding the mixture to provide a dust having an average particle size of about 30 to 50 microns.

EXAMPLE 4

A wettable powder suitable for dispersion in water is prepared in the following manner. The 6,8-dinitro-1,3-benzodioxane in the amount of 5 parts by weight was thoroughly mixed together with 0.3 parts by weight of sodium N-methyl-N-oleoyltaurate, 0.2 parts by weight of sodium lignosulfonate and 4.5 parts by weight of Barden clay. The mixture was ground to provide a powder having an average particle size of about 30 microns. The resulting wettable powder when dispersed in an appropriate volume of water is readily applied to crop and weed areas by spraying techniques, and effective selective control of undesirable weed growth is obtained.

What is claimed is:

A method for the destruction and prevention of weeds which comprises applying to the area to be protected in an amount sufficient to exert a herbicidal action the compound 6,8-dinitro-1,3-benzodioxane.

References Cited

UNITED STATES PATENTS

| 1,807,729 | 6/1931 | Brunner | 260—349.3 X |
| 3,232,736 | 2/1966 | Seefelder et al. | 71—2.5 |

LEWIS GOTTS, *Primary Examiner.*

G. HOLLRAH, *Assistant Examiner.*